(12) United States Patent
Kim

(10) Patent No.: US 12,392,552 B2
(45) Date of Patent: Aug. 19, 2025

(54) VACUUM DRYER NOT REQUIRING VACUUM PUMP

(71) Applicant: Byoung Woo Kim, Seoul (KR)

(72) Inventor: Byoung Woo Kim, Seoul (KR)

(73) Assignee: Byoung Woo Kim, Seoul (KR)

( * ) Notice: Subject to any disclaimer, the term of this patent is extended or adjusted under 35 U.S.C. 154(b) by 480 days.

(21) Appl. No.: 17/795,475

(22) PCT Filed: Jan. 29, 2021

(86) PCT No.: PCT/KR2021/001234
§ 371 (c)(1),
(2) Date: Jul. 26, 2022

(87) PCT Pub. No.: WO2021/154044
PCT Pub. Date: Aug. 5, 2021

(65) Prior Publication Data
US 2023/0358469 A1    Nov. 9, 2023

(30) Foreign Application Priority Data

Jan. 29, 2020  (KR) .................. 10-2020-0010163

(51) Int. Cl.
*F26B 5/04*    (2006.01)
*F26B 9/06*    (2006.01)
(Continued)

(52) U.S. Cl.
CPC .................. *F26B 5/04* (2013.01); *F26B 9/06* (2013.01); *F26B 21/005* (2013.01); *F26B 21/086* (2013.01); *F26B 25/16* (2013.01)

(58) Field of Classification Search
CPC .. F26B 5/04; F26B 9/06; F26B 21/005; F26B 21/086; F26B 25/16
(Continued)

(56) References Cited

U.S. PATENT DOCUMENTS 2,345,548 A * 3/1944 Flosdorf ................... F26B 5/06
34/76
3,218,728 A * 11/1965 Barth ........................ F26B 5/06
34/292
(Continued)

FOREIGN PATENT DOCUMENTS

DE    102020129945 B4 * 12/2023 .......... D06F 58/203
JP    2009-275937 A   11/2009
(Continued)

*Primary Examiner* — Stephen M Gravini
(74) *Attorney, Agent, or Firm* — IP & T GROUP LLP

(57) ABSTRACT

A vacuum dryer not requiring a vacuum pump according to an embodiment of the present invention comprises: a drying chamber in which a drying rack is installed, and an exhaust valve communicating with the interior is provided on the outside of the other side; a steam generator located outside the drying chamber, having a water tank, and connected to a steam inlet; and a heat pump interlocked with the inside and outside of the drying chamber and configured by including a condenser provided in a high-temperature area, a first heat exchanger connected to the condenser outside the drying chamber, an evaporator provided in a low-temperature area, a second heat exchanger connected to the evaporator outside the drying chamber, a compressor connecting the first heat exchanger and the second heat exchanger, and an expansion valve connecting the condenser and the evaporator.

5 Claims, 2 Drawing Sheets

(51) Int. Cl.
*F26B 21/00* (2006.01)
*F26B 21/08* (2006.01)
*F26B 25/16* (2006.01)

(58) Field of Classification Search
USPC .......................................................... 34/92
See application file for complete search history.

(56) References Cited

U.S. PATENT DOCUMENTS

| | | | | |
|---|---|---|---|---|
| 4,893,415 | A * | 1/1990 | Moldrup | F26B 23/005 |
| | | | | 34/406 |
| 5,699,626 | A * | 12/1997 | Chuang | F26B 13/26 |
| | | | | 34/454 |
| 6,112,426 | A * | 9/2000 | Buttazzi | F26B 23/004 |
| | | | | 34/79 |
| 7,334,346 | B2 * | 2/2008 | Nomine | F26B 5/06 |
| | | | | 34/92 |
| 11,874,060 | B2 * | 1/2024 | Lennon-Meyer | F26B 11/04 |
| 11,885,563 | B2 * | 1/2024 | Chudnovsky | D06F 58/26 |
| 11,913,723 | B1 * | 2/2024 | Andrews | F26B 21/083 |
| 12,130,083 | B1 * | 10/2024 | Goldberg | F26B 3/0923 |
| 12,246,266 | B2 * | 3/2025 | Andrews | B01D 1/18 |
| 2017/0160011 | A1 | 6/2017 | Hyde et al. | |
| 2022/0145523 | A1 * | 5/2022 | Wiecek | F26B 23/002 |
| 2023/0358469 | A1 * | 11/2023 | Kim | F26B 21/10 |

FOREIGN PATENT DOCUMENTS

| | | | | |
|---|---|---|---|---|
| JP | 2010-243001 | A | | 10/2010 |
| JP | 2023512095 | A * | | 3/2023 |
| KR | 10-2014-0122783 | A | | 10/2014 |
| KR | 10-1795770 | B1 | | 11/2017 |
| KR | 20210096744 | A * | | 8/2021 |
| WO | WO-2021154044 | A1 * | 8/2021 | ............ F26B 21/005 |

* cited by examiner

A: Vacuum freeze drying area
B: Low-temperature and low-pressure drying area

VACUUM DRYER NOT REQUIRING VACUUM PUMP

TECHNICAL FIELD

The disclosure relates to a vacuum dryer not requiring a vacuum pump, and more particularly, to an apparatus capable of vacuum-drying without using a vacuum pump, a heater, and a heat transfer medium, by using a mechanism which saturates an inside of a drying chamber with steam and then abruptly reduces a volume in the process of phase-changing from stream to a liquid by reducing temperature, and creates a vacuum in the drying chamber.

More specifically, a vacuum dryer not requiring a vacuum pump according to the disclosure includes a condenser which forms a high-temperature area inside a sealed drying chamber, and an evaporator which forms a low-temperature area, wherein the condenser and the evaporator are mutually connected with each other, wherein the condenser and the evaporator are connected to a first heat exchanger and a second heat exchanger, respectively, wherein the first heat exchanger and the second heat exchanger are connected to a compressor to change a heat exchange capacity, wherein a steam generator is provided outside the drying chamber to supply steam to the inside of the drying chamber.

The disclosure relates to a vacuum dryer not requiring a vacuum pump, which produces a dried material of high quality by drying at low temperature under a vacuum condition without using a vacuum pump, by adopting a method whereby an inside of a drying chamber, in which a drying material is piled, is saturated with steam by injecting steam into the drying chamber and discharging air through an interlocked exhaust valve, a heat pump is operated with a heat exchange capacity of a first heat exchanger being set to a maximum value, thereby emitting heat of the first heat exchanger to the outside of the drying chamber and simultaneously cooling the inside of the drying chamber to a reduced temperature of a condenser, the steam undergoes phase change to water or ice in an evaporator, such that pressure is reduced and a vacuum is created, and then, the drying material is dried by forming a high-temperature area by supplying heat to the condenser by reducing the heat exchange capacity of the first heat exchanger, and the steam in the evaporator is liquefied or congealed, thereby forming a low-temperature area and maintaining the vacuum state in the drying chamber.

BACKGROUND ART

The history of food drying goes back to the ancient times to the degree that it is coterminous with the history of mankind. Desiccation is defined as an operation of removing moisture contained in a material. Desiccation aims at improving storage of a drying material and making it easy to deal with and to transport materials, and increasing values. Desiccation may be regarded as one of processing means or processing processes for achieving these aims.

There are various drying methods. Representative drying methods include: convection drying which exposes a drying material to hot air; radiation drying which irradiates a drying material easy to fly like powder with infrared rays, etc.; dehumidification drying which puts a drying material to be dried at low temperature into a dryer provided with a drying agent, such as concentrated sulfuric acid or silica gel; vacuum drying which creates a vacuum on an inside of a dryer to make it easy to evaporate moisture in a drying material; freeze drying which dries a drying material which may be easily decomposed by heat or may be easy to change at room temperature, by freezing; and vacuum freeze drying which creates a vacuum on an inside of a frozen dryer to increase a drying temperature and removes ice from a drying material by directly sublimating.

Quality of dried foods varies according to an applied drying method even if they are the same. Up to now, technology has been enhanced according to traditional experience-based drying methods which use winds (blowing), humidity (dehumidification), temperature (heating), but recently, convergence next-generation dryers based on basic technology of conduction, convection, radiation, pressure, etc. are actively researched and released to the market.

In the case of food, quality of dried food is better as a drying temperature is lower and a drying time is shorter. However, as the drying temperature is lower, the time required to dry is longer, and accordingly, quality may be degraded. For example, in the case of chili pepper except for sun-dried chili pepper, a drying process may be normally performed at about 55° C. for about 40 hours (about 2 days) in a chili pepper dryer. If the drying temperature is reduced to 35° C. under the same condition, the drying time may increase to 160 hours (about 7 days). In this case, the appearance of dried chili pepper may be very good, but the inside of chili pepper may go moldy and the chili pepper may not be used as food. That is, as drying proceeds, spoilage may proceed simultaneously. In our country, there was shade-dried chili pepper which was dried in an airy and shaded place and had better quality than sun-dried chili pepper, but this drying method is difficult to perform and long time is required and a yield is low. Therefore, this method is not found now.

Livestock products and seafood, which easily spoil compared to agricultural products, may be more difficult to dry. This is the reason that the livestock products and the seafood are only dried after a primary process of removing the insides or boiling is performed in order to maintain quality, or are dried only in winter. To overcome this, a salting method using salt and a smoking method using hot smoke are developing.

Today, there is a vacuum freeze dryer developed to solve these problems, but, due to a high price of the device, complexity in manipulation, and a high driving cost required to dry, use of the vacuum freeze dryer is limited to medicine and medical supplies and high-priced foods, and in the case of normal foods, it is difficult to apply the vacuum freeze dryer due to an increase in prices of dried products.

A dryer is a representative energy-excessive consumption device, and most of used energy is consumed as evaporation heat for evaporating moisture in a drying process, that is, as latent heat, and is discharged to air and is wasted. Recent energy-saving dryers save energy by collecting latent heat of steam discarded to air and reusing the heat.

Energy saving technologies for enhancing dryer, and various technologies for enhancing drying efficiency and drying quality are suggested and developing. When food is quickly frozen and then is dried by using a sublimating phenomenon in a food drying process, the food may be dried with the best quality. Therefore, technologies for low-pressure drying, vacuum drying, vacuum freeze drying, vacuum heating drying, or the like by applying this are continuously developing and are being enhanced. In order to enhance quality of dried food, drying should be implemented at a fast speed at a low temperature. Therefore, dryers in this field have almost similar configurations including essential components such as a drying chamber to accommodate a drying material, a vacuum pump, a quick freezer, a heater, and a heat transfer medium, etc.

PRIOR ART LITERATURE

Patent Literature

Korean Patent Registration No. 10-1795770

Detailed Description of the Present Disclosure

[Technical Objects]

A related-art vacuum dryer may have a vacuum pump for maintaining a vacuum in the dryer, and a heater and a heat transfer medium for supplying drying heat to a drying material. Therefore, there are disadvantages that the dryer has a complicated configuration and is expensive, and a driving cost of the dryer is also high.

The disclosure has been developed in order to solve the above-described problems of related-art technology, and an object of the disclosure is to provide a vacuum dryer not requiring a vacuum pump, which is capable of vacuum-drying by creating a vacuum in a drying chamber without using a vacuum pump, by using a mechanism which saturates an inside of the drying chamber with steam and then abruptly reduces a volume in the process of phase-changing from stream to a liquid by reducing temperature, and creates a vacuum in the drying chamber.

The disclosure is configured by including a condenser which forms a high-temperature area inside a drying chamber, and an evaporator which forms a low-temperature area, wherein the condenser and the evaporator are mutually connected with each other, wherein the condenser and the evaporator are connected to a first heat exchanger and a second heat exchanger, respectively, wherein the first heat exchanger and the second heat exchanger are connected to a compressor to change a heat exchange capacity, wherein a steam generator is provided outside the drying chamber to supply steam to the inside of the drying chamber.

An object of the disclosure is to provide an apparatus for establishing and operating a vacuum dryer without using a vacuum pump, a heater, and a heat transfer medium, which have been regarded as essential elements of a vacuum dryer so far, the vacuum dryer drying a drying material in a vacuum state by adopting a method whereby an inside of a drying chamber, in which a drying material is piled, is saturated with steam by injecting steam into the drying chamber, a heat pump is operated with a heat exchange capacity of a first heat exchanger being set to a maximum value, thereby emitting heat of the first heat exchanger to the outside of the drying chamber and simultaneously cooling the inside of the drying chamber to a reduced temperature of a condenser, the steam undergoes phase change to water or ice in an evaporator, such that pressure is reduced and a vacuum is created, and then, the drying material is dried by forming a high-temperature area by supplying heat to the condenser by reducing the heat exchange capacity of the first heat exchanger, and the steam in the evaporator is liquefied or congealed, thereby forming a low-temperature area and maintaining the vacuum state in the drying chamber.

The above-described objects and various advantages will be more obvious to a person skilled in the art from preferred embodiments of the disclosure.

[Technical Solving Means]

To achieve the above-described objects, the disclosure provides a vacuum dryer not requiring a vacuum pump, the vacuum dryer including: a drying chamber which has a sealed inner space formed therein and has a drying rack installed therein, the drying chamber being provided with a steam inlet formed inside of one side surface thereof to be interlocked with an exhaust valve, the exhaust valve being provided on an outside of the other side surface of the drying chamber to be interlocked with the steam inlet; a steam generator which is positioned outside the drying chamber and is provided with a water tank, and is connected to the steam inlet; and a heat pump which is provided to be interlocked with an inside and an outside of the drying chamber, and forms a high-temperature area and a low-temperature area in the drying chamber, wherein, when the steam generator saturates the inside of the drying chamber with steam, the heat pump reduces a volume of the steam by liquefying or sublimating the steam by reducing an internal temperature of the drying chamber, thereby creating a vacuum state inside the drying chamber.

According to an embodiment, the heat pump may further include: a condenser provided in the high-temperature area; a first heat exchanger connected to the condenser from an outside of the drying chamber; an evaporator provided in the low-temperature area; a second heat exchanger connected to the evaporator from an outside of the drying chamber; a compressor connecting between the first heat exchanger and the second heat exchanger; and an expansion valve connecting the condenser and the evaporator.

According to an embodiment, the vacuum dryer may further include: a conical cyclone configured to be enclosed by the evaporator; a blower inserted into and mounted on a cylinder portion formed on one end of the cyclone; and a motor mounted on an upper end of the blower, wherein the cyclone has an inner space formed from a tubular suction inlet provided at the cylinder portion on one end thereof to a cone portion disposed on the other end, a discharge outlet is provided on a side surface of the blower, a lower end of the blower is connected to an inside of the cyclone, and wind blowing generated in the motor communicates with the discharge outlet and the cone portion.

According to an embodiment, the vacuum dryer may further include a storage tank connected to the cone portion of the cyclone, wherein the storage tank is connected to a discharge pump disposed outside the drying chamber, and the discharge pump is connected with a water tank through a pipe, and a circulation structure is formed such that steam generated in the high-temperature area of the drying chamber is condensed in the cyclone, is discharged in a form of water or ice, and is collected in the storage tank.

According to an embodiment, a check valve may be provided on a portion connecting the storage tank and the discharge pump outside the drying chamber to prevent backflow of a condensate of the water tank to the storage tank.

Detailed matters of other embodiments are included in the detailed descriptions and the drawings.

Advantageous Effects

According to the vacuum dryer not requiring the vacuum pump according to the disclosure, the following effects may be achieved.

First, vacuum drying may be performed by creating a vacuum state in the drying chamber without using a vacuum pump, a heater, and a heat transfer medium, by using a mechanism which saturates the inside of the drying chamber with steam and then abruptly reduces a volume in the process of phase changing from steam into a liquid by reducing temperature, thereby creating a vacuum inside the drying chamber.

Second, heat exchange may be directly performed in the drying chamber without using a vacuum pump, a heater, and a heat transfer medium, which are essential elements of a vacuum dryer, and accordingly, a configuration of the dryer may be simplified and durability and reliability of the dryer may be enhanced.

Third, due to characteristics of the vacuum dryer of the disclosure which is operated simply by driving the heat pump, a failure rate may be noticeably low compared to a related-art complicated vacuum freeze dryer, and maintenance and repair may be easy to perform.

Fourth, a price of the dryer may be reduced and a drying cost for food may also be reduced. Therefore, normal foods that are difficult to dry due to a high price of a dryer and a high driving cost may be dried with high quality by the dryer of the disclosure, and our dried food culture may advance one step further.

Fifth, driving energy of a vacuum pump may be saved, and also, the heat pump may have a high performance factor, and heat of the heat pump is only circulated for heat emission (drying) and heat absorption (condensation) in the drying chamber. Therefore, energy loss may not occur except for drying, and high energy efficiency may be obtained. That is, all of heat involved in drying is not lost on the outside of the drying chamber, and energy saving of high efficiency may be achieved.

Sixth, a drying material is sealed from the outside during the entire drying process, and foreign substances such as minute dust are not prevented from contaminating, so that clean drying is achieved.

Seventh, a competitive dryer may be released in the market by simplifying a system and implementing energy saving, and our dried food culture may advance one step further.

BEST MODE FOR EMBODYING THE INVENTION

Figure 1:
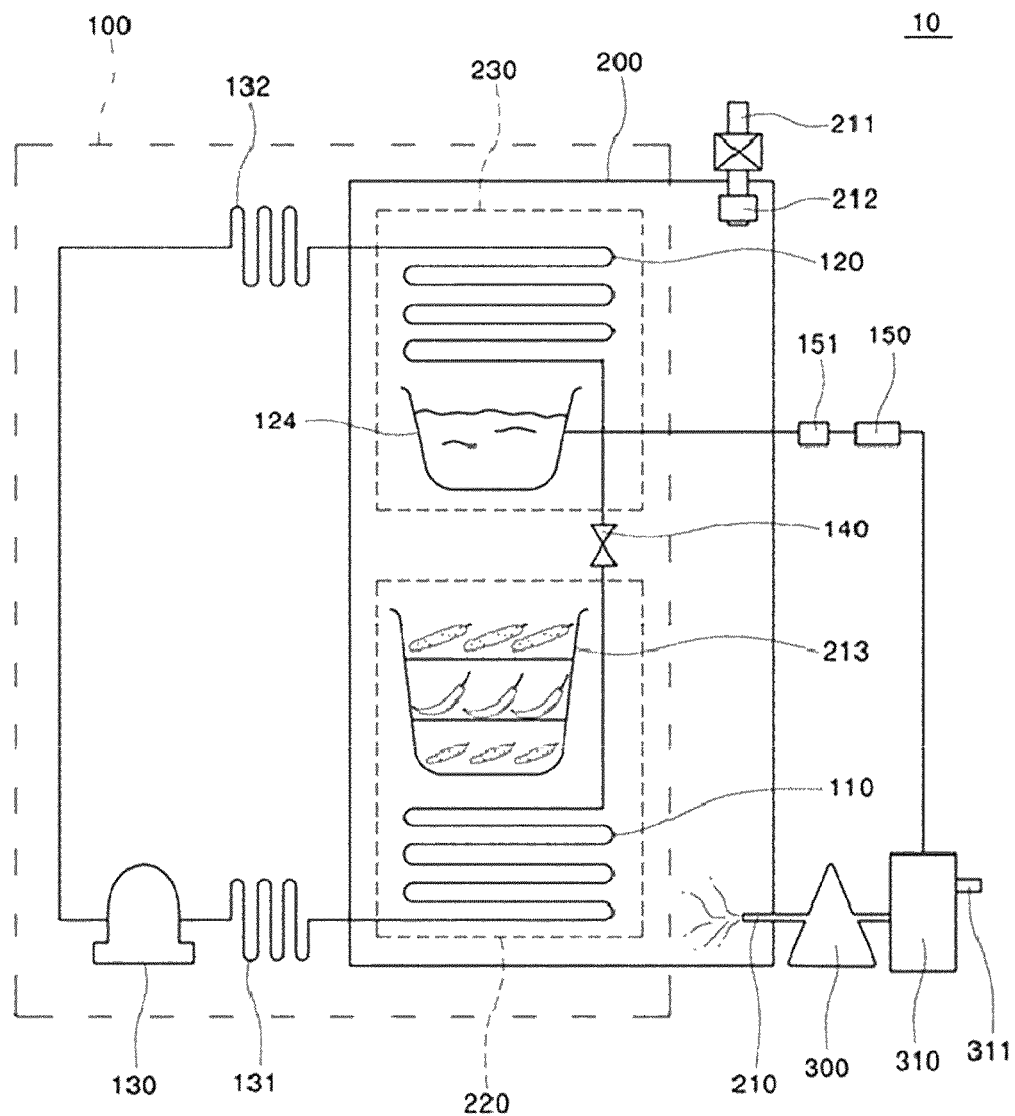
FIG. 1 is a view illustrating a schematic configuration of a vacuum dryer not requiring a vacuum pump according to an embodiment of the disclosure.

Preferred embodiments of the disclosure will be described in detail with reference to the accompanying drawings for easy understanding of the disclosure.

Prior to explaining the disclosure, explanations of a specific structure or function described below are just provided for explaining embodiments according to the concept of the disclosure, and various changes may be made to embodiments according to the concept of the disclosure, and the scope of the disclosure should not be interpreted as being limited to embodiments described below in detail.

In addition, various changes may be made to embodiments according to the concept of the disclosure, and embodiments may have various forms, and specific embodiments are illustrated in the drawings and are described in the disclosure in detail.

However, these are not intended to limit embodiments according to the concept of the disclosure to specific forms, and should be understood as including modifications, equivalents, or alternatives included in the idea and the technical scope of the disclosure.

The embodiments are provided so that the disclosure will be thorough and complete, and will fully convey the scope of the application to a person skilled in the art. Accordingly, shapes of elements on the drawings may be expressed in exaggerated forms to be explained more clearly.

It should be noted that the same reference numerals are used for the same elements in respective drawings. Detailed explanations of well-known functions and configurations are omitted when it is deemed that they may unnecessarily obscure the essence of the disclosure.

Figure 2:
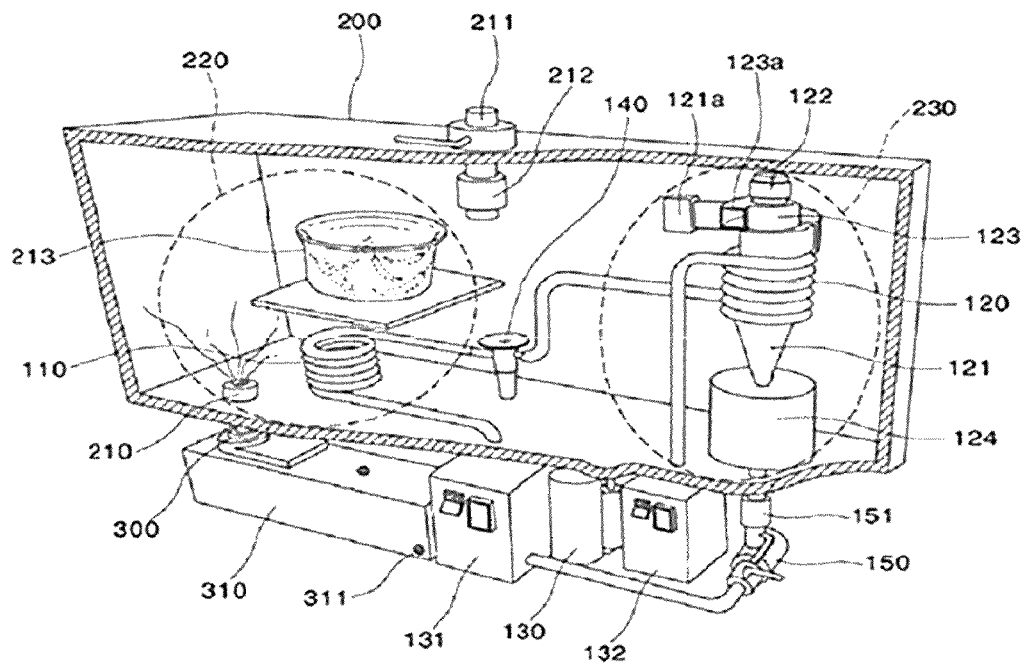
FIG. 2 is a view illustrating a configuration of a vacuum dryer not requiring a vacuum pump according to another embodiment of the disclosure.
Figure 3:
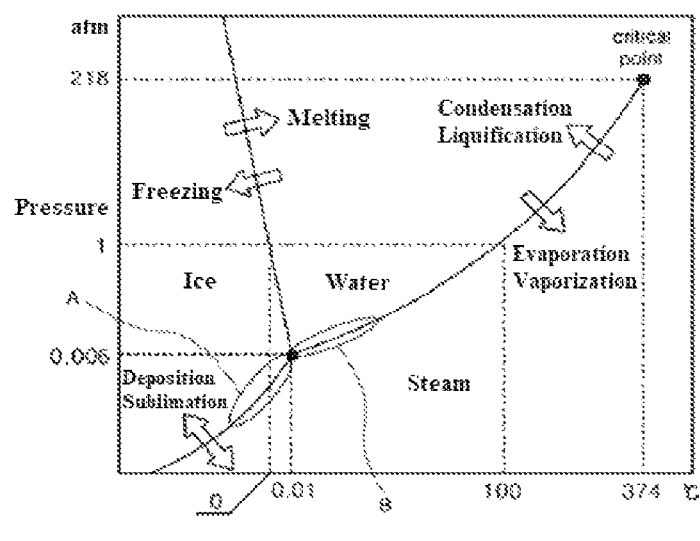
FIG. 3 is a view illustrating a state change curve of water according to a pressure and a temperature, which indicates a principle to be applied to a vacuum dryer not requiring a vacuum pump according to an embodiment of the disclosure.

FIG. 1 is a view illustrating a schematic configuration of a vacuum dryer not requiring a vacuum pump according to an embodiment of the disclosure, FIG. 2 is a view illustrating a configuration of a vacuum dryer not requiring a vacuum pump according to another embodiment of the disclosure, and FIG. 3 is a view illustrating a state change curve of water according to a pressure and a temperature, which indicates a principle to be applied to a vacuum dryer not requiring a vacuum pump according to an embodiment of the disclosure.

A vacuum dryer 10 not requiring a vacuum pump according to a preferred embodiment of the disclosure includes a drying chamber 200, a heat pump 100, and a steam generator 300.

The drying chamber 200 is formed in a case-like shape to form a sealed inner space, and functions as a space to place and dry a drying material therein.

An inside of the drying chamber 200 may be set to be divided into a high-temperature area 220 and a low-temperature area 230. This is not artificially divided by a device or a component, but is divided into spaces specified by functions performed by the heat pump 100.

A steam inlet 210 may be provided on a lower end of the drying chamber 200 when viewed from a side surface of the drying chamber 200, and an exhaust valve 211 may be provided on an upper end.

In this case, the positions of the steam inlet 210 and the exhaust valve 211 may be any positions that are appropriate to optimization of functions of the disclosure.

The steam generator 300 provided on an outside of the drying chamber 200 may be connected with the inside of the drying chamber 200 through the steam inlet 210 on the lower end of the drying chamber 200.

When the steam generator 300 generates steam and supplies steam to the inside of the drying chamber 200 through the steam inlet 210, the drying chamber 200 may be full of steam, and in this case, a function of discharging air and steam inside the drying chamber 200 or sealing may be performed by controlling opening and closing of the exhaust valve 211.

A water tank 310 may be connected to the steam generator 300 to generate steam, and a drain 311 may be attached to the water tank 310 to inject and discharge water.

The exhaust valve 211 may be provided on an outside of the upper end of the drying chamber 200 to perform a function of discharging air or steam inside the drying camber 200 or blocking discharging, and an exhaust check valve 212 may be provided on a lower end of the exhaust valve 211 to prevent backflow of external air to the inside of the drying chamber 200.

In this case, the exhaust valve 211 and the exhaust check valve 212 may be connected one on the other, and the exhaust valve 211 may be provided on an outside of the upper end of the drying chamber 200, and the exhaust check valve 212 may be provided on an inside of the upper end of the drying chamber 200.

The drying chamber 200 may have a drying rack 213 provided therein to allow a drying material to be deployed thereon.

The drying rack 213 may be provided in the form of a wire mesh to allow heat and air to pass therethrough, or in the form of an iron plate having good conductivity, and may be positioned in the high-temperature area 220 inside the drying chamber 200 in order to maximize a drying effect. Specifically, it is preferable that the drying rack 213 is positioned on an upper end of a condenser 110 of the heat pump 100, which will be described below, to be directly exposed to heat and high temperature emitted from the condenser 110.

The drying rack 213 may be configured with a single layer or multiple layers, and its shape and the number of layers may be variably designed and applied according to a whole shape of the drying chamber 200, an installation place of the dryer, and a using purpose.

The drying chamber 200 may be provided with a cover, and in a preferred embodiment of the disclosure, the cover may be positioned on an upper end of the drying chamber 200.

A drying material may be piled in or taken out from the drying chamber 200 by opening the cover, and a device positioned inside the drying chamber 200 may be checked or repaired.

The drying chamber 200 may create a sealed state with the cover being mounted thereon, and the sealed drying chamber 200 may communicate with the outside through the steam inlet 210 and the exhaust valve 211.

The heat pump 100 may be provided to be interlocked with an inside and an outside of the drying chamber 200.

The heat pump 100 may perform a core function of creating a vacuum inside the drying chamber 200 and then drying a drying material, and of maintaining an environment where the drying material is dried in a vacuum state by maintaining a thermal circulation and thermal equilibrium state.

To achieve this, the heat pump 100 may be configured by including the condenser 110, an evaporator 120, an expansion valve 140, a compressor 130, a first heat exchanger 131, a second heat exchanger 132.

The condenser 110, the evaporator 120, the expansion valve 140 may be positioned inside the drying chamber 200, and the compressor 130, the first heat exchanger 131, the second heat exchanger 132 may be positioned outside the drying chamber 200.

The condenser 110 may be positioned in the high-temperature area 220 inside the drying chamber 200, and may be connected with the first heat exchanger 131.

The condenser 110 may perform functions of condensing a refrigerant and drying a drying material, and to achieve this, the condenser 110 may have any shape and may be formed on any position. However, according to a preferred embodiment of the disclosure, the condenser 110 may have a pipe-like shape and may be formed in the high-temperature area 220 in a wound shape like a coil, and may be positioned under the drying rack 213.

One end of the condenser 110 may be connected with the first heat exchanger 131 in the shape of a pipe, and the other end may be connected with the evaporator 120 in the shape of a pipe.

The evaporator 120 may be positioned in the low-temperature area 230 inside the drying chamber 200.

The evaporator 120 may perform a function of liquefying or congealing steam inside the drying chamber 200, and to achieve this, the evaporator 120 may be formed in any shape and on any position, and according to a preferred embodiment of the disclosure, the evaporator 120 may be configured in the form of a wound coil similarly to the condenser 110.

As shown in FIG. 1, the drying chamber 200 may be formed in a vertical direction, and the condenser 110 and the evaporator 120 may be configured such that the condenser 110 is positioned on a lower portion of the drying chamber 200 and the evaporator 110 is positioned on an upper portion. As shown in FIG. 2, the drying chamber 200 may be formed in a horizontal direction, and the condenser 110 and the evaporator 120 may be configured in parallel, such that the condenser 110 is positioned at one side inside the drying chamber 200 and the evaporator 120 is positioned at the other side.

In this case, the expansion valve 140 may be provided on a connection portion between the condenser 110 and the evaporator 120.

The expansion valve 140 may perform a function of decompressing the refrigerant of high-temperature, high-pressure, which is condensed and liquefied by compressing in the condenser 110, to a pressure enough to evaporate, and also, the expansion valve 140 may perform a function of adjusting a flow of the refrigerant and providing to the evaporator 120.

The high-temperature and high-pressure refrigerant of the condenser 110 is quickly decompressed to a low pressure through the expansion valve 140 and then is discharged to the evaporator 120, thereby forming a low-temperature cooling state. Therefore, the expansion valve 140 may be a reference point by which the inside of the drying chamber 200 is divided into the high-temperature area 220 by the condenser 110 and the low-temperature area 230 by the evaporator 120.

One end of the evaporator 120 may be connected with the condenser 110 and the other end may be connected with the second heat exchanger 132.

A storage tank 124 may be positioned inside the drying chamber 200, and an upper end of the storage tank 124 may be connected to a cyclone 121, which will be described below, and the storage tank 124 may receive and store a condensate which is liquefied or congealed by the evaporator 120 and undergoes phase change to water or ice, and a lower end of the storage tank 124 may be connected with a discharge pump 150 disposed the outside the drying chamber 200 to discharge to the outside.

A pipe may be connected to the lower end of the storage tank 124 and may pass through a lower portion of the drying chamber 200, and may be connected to the discharge pump 150 provided on the outside of the drying chamber 200, and the discharge pump 150 may perform a function of discharging the condensate from the storage tank 124.

In this case, a check valve 151 may be provided on an outer section of the drying chamber 200 between the discharge pump 150 and the storage tank 124 adjacent to the discharge pump 150 in order to prevent backflow of the condensate from the discharge pump 150 to the storage tank 124.

The compressor 130 may have one end connected with the first heat exchanger 131 and the other end connected with the second heat exchanger 132, and as a result, a circulation structure is formed, such that a refrigerant compressed in the compressor 130 is transmitted to the condenser 110 through the first heat exchanger 131, and is transmitted back to the compressor 130 from the condenser 110 through the expansion valve 140, the evaporator 120, the second heat exchanger 132.

To summarize, the refrigerant may be circulated from the compressor 130 in order of the first heat exchanger 131, the condenser 110, the evaporator 120, the second heat exchanger 132, and the compressor 130.

Referring to the above-described structure, it can be seen that a vacuum pump is not configured and a heater or a heat transfer medium is not used. In this state, when the inside of the drying chamber is saturated with steam and then temperature is reduced, the steam undergoes phase change to a liquid or a solid, and the volume thereof is abruptly reduced, and accordingly, the inside of the drying chamber goes into a vacuum state. That is, a vacuum state of low temperature is created with the above-described components without a vacuum pump, a heater, and a heat transfer medium, and simultaneously, quick drying is performed at a high temperature, so that drying quality of a drying material may be enhanced.

Based on the brief explanation above, detailed operations of the vacuum dryer 10 not requiring the vacuum pump according to the disclosure will be described hereinafter.

First, steam may be generated in the steam generator 300 by using water stored in the water tank 310, and the steam may be injected into the inside of the drying chamber 200 through the steam inlet 210.

In this case, the exhaust valve 211 on the upper end of the drying chamber 200 may be opened to discharge indoor air and to allow the air in the drying chamber 200 to be substituted with steam.

When the inside of the drying chamber 200 is saturated with steam, the exhaust valve 211 and the steam inlet 210 may be closed to make the drying chamber 200 go into a sealed state.

Next, a heat exchange capability of the first heat exchanger 131 may be set to a maximum value, and then, the heat pump 100 may be driven.

The heat pump 100 may discharge heat to the outside of the drying chamber 200 through the first heat exchanger 131, and simultaneously, a compressed refrigerant may be supplied to the condenser 110 by external emission of heat, such that the drying chamber 200 saturated with the steam starts to be cooled.

As the drying chamber 200 is cooled, the steam is condensed by the evaporator 120 in the low-temperature area 230 through the phase change from steam to water or ice, such that the pressure inside the drying chamber 200 is reduced.

As a result, an initial vacuum state may be created in the drying chamber 200 even without a vacuum pump.

When the low-temperature vacuum state is created inside the drying chamber 200, the heat exchange capacity of the first heat exchanger 131 may be reduced and heat emitted to the outside may be supplied to the condenser 110.

In this process, an amount of heat emitted from the condenser 110 may be adjusted by adjusting the capacity of the first heat exchanger 131, and an amount of heat absorbed by the evaporator 120 may be adjusted by adjusting the capacity of the second heat exchanger 132, such that thermal balance is achieved in the high-temperature area by the condenser 110 and the low-temperature area by the evaporator 120 in the drying chamber 200.

Heat supplied to the condenser 110 forms the high-temperature area 220 in the drying chamber 200, and dries a drying material deployed on the drying rack 213 positioned above the condenser 110.

In this state, only the area where the drying material is positioned may be dried at a high temperature while the inside of the drying chamber 200 is in the low-temperature vacuum state.

However, in a vacuum state, moisture of a drying material may be easily evaporated, and quick drying at a low temperature may enhance quality of the drying material. Therefore, when drying is performed in the low-temperature vacuum state, the best drying quality may be achieved, and in this process, drying may be performed with a simple configuration without a heat transfer medium such as a vacuum pump and a heater, etc.

During the drying process as described above, heat may be continuously supplied from the condenser 110 to the drying material in the high-temperature area 220 in the drying chamber 200, thereby continuously drying, and the steam in the low-temperature area 230 is condensed (liquefied) or deposited (sublimated) in the evaporator 120 and undergoes the phase change to water or ice, such that the vacuum state inside the space is continuously maintained.

In addition, a thermal imbalance state in which the low-temperature area 230 is continuously cooled and the high-temperature area 220 is continuously heated may continue, but the thermal equilibrium state in which the total entropy of the drying chamber 200, which is a closed system, is almost constant is maintained, and drying is continuously performed.

Referring to the state curve of water shown in FIG. 3, water is boiled at 100° C. at 1 atm pressure. However, it may be seen that water is boiled at about 70° C. at 0.3 atm pressure, is boiled at about 60° C. at 0.2 atm pressure, or is boiled at about 46° C. at 0.1 atm pressure. This is because the steam pressure of water changes in proportion to temperature.

Water boiling may mean that very quick drying is performed.

There are low-temperature and low-pressure dryers using the above-described principle on the market. However, such a dryer requires a blower 123 to be mounted to maintain low pressure in the drying chamber 200. Since the blower is operated under atmospheric pressure, a difference in pressure between both ends of the blower 123 increases as pressure inside the drying chamber 200 decreases.

Therefore, a normal blower 123 may not be used, and a ring blower or a turbo blower of high performance which have great negative pressure may be mounted in a really used low-temperature and low-pressure dryer.

The vacuum dryer 10 not requiring the vacuum pump according to an embodiment of the disclosure may increase internal pressure and temperature of the dryer by increasing heat supply to the drying chamber 200 through the first heat exchanger 131, and may reduce the internal pressure and temperature of the dryer by reducing heat supply.

This is equally applied to the low-temperature area 230.

Therefore, a driving mode may be freely set from a low-temperature and low-pressure drying area (the B area of FIG. 3) to a vacuum freeze drying area (the A area of FIG. 3), and may be operated without requiring the blower 123 of high performance or the vacuum pump, and the driving mode may be flexibly changed according to necessity while the dryer is being operated.

Factors closely related to drying may include temperature, humidity, wind blowing.

As shown in FIG. 3, an effect of wind blowing in the vacuum freeze drying area may be small, but wind blowing becomes a nonnegligible factor when pressure increases to a low pressure, and may influence drying.

That is, wind blowing may be regarded as a meaningful factor in the low-temperature and low-pressure drying area.

To complement this, the vacuum dryer 10 not requiring the vacuum pump according to an embodiment of the disclosure may include the blower 123 and the cyclone 121 mounted on the evaporator 120 of the low-temperature area 230 in which steam is condensed or frozen, and may be enhanced to increase a drying speed.

The cyclone 121 may have a conical shape and may be configured to be enclosed by the evaporator 12 in a coil shape. In an embodiment of the disclosure, the cyclone 121 may have a cylinder portion formed at one wide end thereof to face an upper portion, and a cone portion formed at the other narrow end thereof to face a lower end.

A tube may protrude from a side surface of the cylinder portion at one end of the cyclone 121 toward the high-temperature area 220 in the form of a horizontal chimney, thereby forming a suction inlet 121a.

Steam passing through the high-temperature area 220 flows into the cyclone 121 through the suction inlet 121a, and cooling is continuously performed in the evaporator 120 enclosing the cyclone 121, such that the steam flowing into the cyclone 121 is condensed or frozen and undergoes the phase change to water or ice, and water or ice is collected in the storage tank 124.

The blower 123 may be provided on the cylinder portion at one end of the cyclone 121 to correspond to the shape of the cylinder portion, and may cover an upper end of the cyclone 121, and a discharge outlet 123a may be provided on a side surface of the blower 123.

In addition, a motor 122 may be mounted on an upper end of the blower 123, and may be operated to discharge steam in the blower 123 to the outside through the discharge outlet 123a.

To summarize, the evaporator 120 of the low-temperature area 230 according to an embodiment of the disclosure includes the cyclone 121 disposed in an inner space formed by the coil shape thereof, and the blower 123 and the motor 122 are consecutively connected to an upper portion of the cyclone 121, and the storage tank 124 is connected to a lower portion of the cyclone 121.

Steam in the drying chamber 200 flows through the suction inlet 121a of the cyclone 121 and is cooled by the evaporator 120 enclosing the cyclone 121, and is condensed or frozen, such that water or ice is collected in the storage tank 124. In this case, a small amount of steam that is not condensed may be discharged through the discharge outlet 123a of the blower 123 by wind blowing generated by the motor 122.

That is, when the steam flowing into the cyclone 121 undergoes the phase change to water or ice, the water or ice may drop down to the storage tank 124, and steam that does not undergo the phase change and remains as it is may be discharged back to the inside of the drying chamber 200.

Since the blower 123 is operated in a very-low-pressure area below an atmospheric pressure, a normal blower 123 having a blade of an appropriately designed shape may be used.

The suction inlet 121a of the cyclone 121 may be geometrically formed and may be appropriately disposed to effectively collect steam generated in the high-temperature area 220 as shown in FIG. 2.

According to the kinetic theory of gases, a pressure of gas may be defined by a force by which molecules collide with a wall surface of a vessel. Since the number of steam molecules per 1 liter is astronomical even if the steam is in the vacuum freeze drying area where sublimation is performed at a pressure of 0.006 atm, the effect of wind blowing may be significant.

Ice frozen by the cyclone 121 may be collected in the storage tank 124 by using a defrost heater or defrosting operation of the heat pump 100.

Condensate in the form of water or ice collected in the storage tank 124 through the cyclone 121 may be discharged by operating the discharge pump 150 which is connected with the cyclone 121 and is provided on the outside of the drying chamber 200, and may be collected in the water tank 310 through a pipe.

The discharge pump 150 may perform a function of draining the condensate from the storage tank 124 by using a suction force, and transmitting to the water tank 310.

In this case, the check valve 151 may be provided on a connection between the discharge pump 150 and the storage tank 124 to prevent backflow of the condensate to the storage tank 124.

The condensate collected in the water tank 310 may be turned into steam by the steam generator 300, and the steam may be circulated through the process of saturating the inside of the drying chamber 200, condensing by cooling and then discharging.

Accordingly, maximization of resource recycling efficiency may be guaranteed through the process of reusing without wasting water resources.

On the other hand, the refrigerant which is decompressed through the expansion valve 140 in the condenser 110 and then is delivered to the evaporator 120 may pass through the evaporator 120 while maintaining the low-temperature and low-pressure state of the inside of the drying chamber 200, and may be delivered to the second heat exchanger 132 along a pipe line of the outside of the drying chamber 200.

The second heat exchanger 132 may convert the refrigerant of a high pressure into a refrigerant of a low pressure through heat exchange, and then, may prepare the refrigerant to be compressed into a refrigerant of a high pressure in the compressor 130 through the first heat exchanger 131.

Accordingly, since heat of the heat pump 100 which is generated by the compressor 130 by compressing at high temperature and high pressure through the first heat exchanger 131 is circulated to the second heat exchanger 132 only by undergoing the process of heat emission (drying) of the high-temperature area 220 and heat absorption (condensation) of the low-temperature area 230 in the drying chamber 200, energy loss does not occur except for drying and high energy efficiency is achieved.

That is, all of heat involved in drying is not lost on the outside and thermal transfer is performed in the drying chamber 200, so that high efficient energy saving is possible.

In addition, since any vacuum pump is not configured and a heat emitting medium like a heater is not provided in the thermal transfer process and the drying process, the configuration may be simplified and a dried material of high quality may be produced.

An example of use of the vacuum dryer 10 not requiring the vacuum pump according to a preferred embodiment will be described based on the above explanations.

First, a user opens the cover of the drying chamber 200 and places a drying material on the drying rack 213 in the drying chamber 200.

Next, the user closes the cover of the drying chamber 200 and sets the heat exchange capacity of the first heat exchanger 131 to a maximum value.

In addition, the user opens the steam inlet 210 and the exhaust valve 211, and connects the steam generator 300 to the steam inlet 210 and then injects steam into the drying chamber 200 by driving the steam generator 300.

At the same time as the steam is injected into the drying chamber 200, air existing in the drying chamber 200 is discharged to the outside of the drying chamber 200 through the exhaust valve 211.

Through this process, air in the drying chamber 200 may be substituted with steam, and, when the drying chamber 200 is saturated with steam, the exhaust valve 211 and the steam inlet 210 are closed.

The heat pump 100 is driven.

Since the heat pump 100 operates while emitting heat to the outside of the drying chamber 200 through the first heat exchanger 131, a condensation process may be performed in the condenser 110 inside the drying chamber 200, and refrigerant is decompressed while passing through the expansion valve 140 and steam is condensed in the low-temperature area 230 where a heater is positioned through the phase change to water or ice. Therefore, pressure in the drying chamber 200 may be reduced and a vacuum state may be created inside the drying chamber 200 without a vacuum pump.

When a driving mode of a pressure and a temperature desired by the user is achieved, the heat exchange capacity of the first heat exchanger 131 may be reduced and heat may be supplied to the condenser 110 of the heat pump 100.

In this case, thermal balance may be achieved in the drying chamber 200 by adjusting an amount of heat emitted from the condenser 110 and an amount of heat absorbed by the evaporator 120 by adjusting the capacity of the first heat exchanger 131.

Accordingly, the drying material is dried on the drying rack 213 positioned in the high-temperature area 220 where the condenser 110 emits heat. This state is entirely a vacuum state of the inside of the drying chamber 200, and a low temperature is maintained in the low-temperature area 230 through a liquefying or sublimating process in the evaporator 120. Therefore, the drying material may be quickly dried in the low-temperature vacuum state.

Accordingly, the drying material dried in the best state may be acquired.

When drying is completed, the driving of the heat pump 100 is stopped and the exhaust valve 211 is opened, and then, the dried material is taken out by opening the cover.

Through the above-described procedure, the drying material may be dried by using the vacuum dryer 10 not requiring the vacuum pump according to the disclosure.

The above-described process and characteristics of the disclosure may be summarized as follows.

The mass of 1 mole of water is 18 grams, and, when the water is evaporated and is turned into steam in a standard state, the volume of water is changed to 22.4 liters at 1 atm. Therefore, the volume of water in a liquid state or solid state is changed by 1,200 times, compared to the volume of water in a gaseous state.

That is, when a sealed space of 22.4 liters is filled with steam at 1 atm pressure and the steam is condensed by removing heat from the inside, the steam undergoes the phase change to be turned into water of 18 cc, and pressure of the sealed space is reduced to about $\frac{1}{1,200}$ (0.001 atm pressure or below).

Since drying is an operation for removing moisture contained in a material, a new vacuum dryer may be established by using such a physical property of water.

That is, after the inside of the sealed drying chamber 200 is filled with steam, when the heat pump 100 is operated in the drying chamber, the steam is condensed around the evaporator 120 and internal pressure of the drying chamber 200 is reduced, and heat collected in the evaporator 120 may be supplied to a drying material around the condenser 110 as drying heat.

Referring to this process, it may be seen that evaporation of moisture and condensation are continuously performed and simultaneously a vacuum is maintained only by operating the heat pump 100 in the drying chamber 200, without having to provide a vacuum pump.

In addition, since a pressure may be set for low-pressure drying or vacuum drying and may be maintained by appropriately adjusting the evaporator 120 and the condenser 110, and a temperature may be set for low-temperature drying or freeze drying and may be maintained, an innovative dryer having various functions may be implemented.

The above-described embodiments of the disclosure are merely examples, and it will be understood by a person skilled in the art that various changes can be made thereto and other equivalent embodiments are possible.

Therefore, it will be understood that the disclosure is not limited to the form mentioned in the detailed descriptions. Therefore, the scope of the technical protection of the disclosure should be defined by the technical concept of the appended claims.

In addition, it should be understood that the disclosure includes the sprits of the disclosure defined by the appended claims, and all variations, equivalents, and alternatives within the scope of the claims.

EXPLANATION OF SINGS

10: Vacuum dryer not requiring a vacuum pump
100: heat pump
110: condenser
120: evaporator
121: cyclone
121a: suction inlet
122: motor
123: blower
123a: discharge outlet
124: storage tank
130: compressor
131: first heat exchanger
132: second heat exchanger
140: expansion valve
150: discharge pump
151: check valve
200: drying chamber
210: steam inlet
211: exhaust valve
212: exhaust check valve
213: drying rack
220: high-temperature area
230: low-temperature area
300: steam generator
310: water tank
311: drain

What is claimed is:

1. A vacuum dryer not requiring a vacuum pump, the vacuum dryer comprising:
   a drying chamber which has a sealed inner space formed therein and has a drying rack installed therein, the drying chamber being provided with a steam inlet formed inside of one side surface thereof to be interlocked with an exhaust valve, the exhaust valve being provided on an outside of the other side surface of the drying chamber to be interlocked with the steam inlet;
   a steam generator which is positioned outside the drying chamber and is provided with a water tank, and is connected to the steam inlet; and
   a heat pump which is provided to be interlocked with an inside and an outside of the drying chamber, and forms a high-temperature area and a low-temperature area in the drying chamber,
   wherein, when the steam generator saturates the inside of the drying chamber with steam, the heat pump reduces a volume of the steam by liquefying or sublimating the steam by reducing an internal temperature of the drying chamber, thereby creating a vacuum state inside the drying chamber.

2. The vacuum dryer of claim 1, wherein the heat pump further comprises: a condenser provided in the high-temperature area; a first heat exchanger connected to the condenser from an outside of the drying chamber; an evaporator provided in the low-temperature area; a second heat exchanger connected to the evaporator from an outside of the drying chamber; a compressor connecting between the first heat exchanger and the second heat exchanger; and an expansion valve connecting the condenser and the evaporator.

3. The vacuum dryer of claim 2, further comprising: a conical cyclone configured to be enclosed by the evaporator; a blower inserted into and mounted on a cylinder portion formed on one end of the cyclone; and a motor mounted on an upper end of the blower,
   wherein the cyclone has an inner space formed from a tubular suction inlet provided at the cylinder portion on one end thereof to a cone portion disposed on the other end, a discharge outlet is provided on a side surface of the blower, a lower end of the blower is connected to an inside of the cyclone, and wind blowing generated in the motor communicates with the discharge outlet and the cone portion.

4. The vacuum dryer of claim 3, further comprising a storage tank connected to the cone portion of the cyclone,
   wherein the storage tank is connected to a discharge pump disposed outside the drying chamber, and the discharge pump is connected with a water tank through a pipe, and a circulation structure is formed such that steam generated in the high-temperature area of the drying chamber is condensed in the cyclone, is discharged in a form of water or ice, and is collected in the storage tank.

5. The vacuum dryer of claim 4, wherein a check valve is provided on a portion connecting the storage tank and the discharge pump outside the drying chamber to prevent backflow of a condensate of the water tank to the storage tank.

* * * * *